United States Patent
Krajenke et al.

(10) Patent No.: US 9,073,478 B2
(45) Date of Patent: Jul. 7, 2015

(54) ENERGY ABSORBING HEADLAMP ASSEMBLY AND A RESETTABLE HEADLAMP ASSEMBLY

(71) Applicant: GM GLOBAL TECHNOLOGY OPERATIONS LLC, Detroit, MI (US)

(72) Inventors: Gary W. Krajenke, Warren, MI (US); Carl B. Corman, Farmington Hills, MI (US); Anil A. Masih, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/853,101

(22) Filed: Mar. 29, 2013

(65) Prior Publication Data

US 2014/0293638 A1   Oct. 2, 2014

(51) Int. Cl.
  *B60Q 1/00* (2006.01)
  *B60Q 3/00* (2006.01)
  *B60Q 11/00* (2006.01)
  *F21V 15/04* (2006.01)
  *B60Q 1/04* (2006.01)

(52) U.S. Cl.
  CPC .................................. *B60Q 1/0491* (2013.01)

(58) Field of Classification Search
  USPC .......................................... 362/507, 523, 569
  See application file for complete search history.

(56) References Cited

U.S. PATENT DOCUMENTS

| 4,118,765 | A  | * | 10/1978 | Atsuchi ........................ 362/465 |
| 4,276,581 | A  | * | 6/1981 | Orii et al. ........................ 362/40 |
| 2003/0142503 | A1 | * | 7/2003 | Ericsson et al. ............... 362/487 |
| 2012/0049547 | A1 | * | 3/2012 | Nishi et al. ..................... 293/132 |

* cited by examiner

*Primary Examiner* — Donald Raleigh
(74) *Attorney, Agent, or Firm* — Quinn Law Group, PLLC

(57) ABSTRACT

An energy absorbing headlamp assembly and a resettable headlamp assembly are disclosed. The assemblies include a first component and a headlamp assembly supported by the first component. The assemblies also include an energy absorbing device operatively coupled to the headlamp assembly and the first component to absorb energy when a first force is applied to the headlamp assembly. For the energy absorbing headlamp assembly, the device includes a link and a biasing mechanism coupled to each other such that the biasing mechanism continuously applies a second force to the link to bias the link to a first position when the headlamp assembly is in an initial position and a second position when the headlamp assembly is in a displaced position. For the resettable headlamp assembly, the device allows movement of the headlamp assembly from the displaced position back to the initial position when the first force is removed.

20 Claims, 8 Drawing Sheets

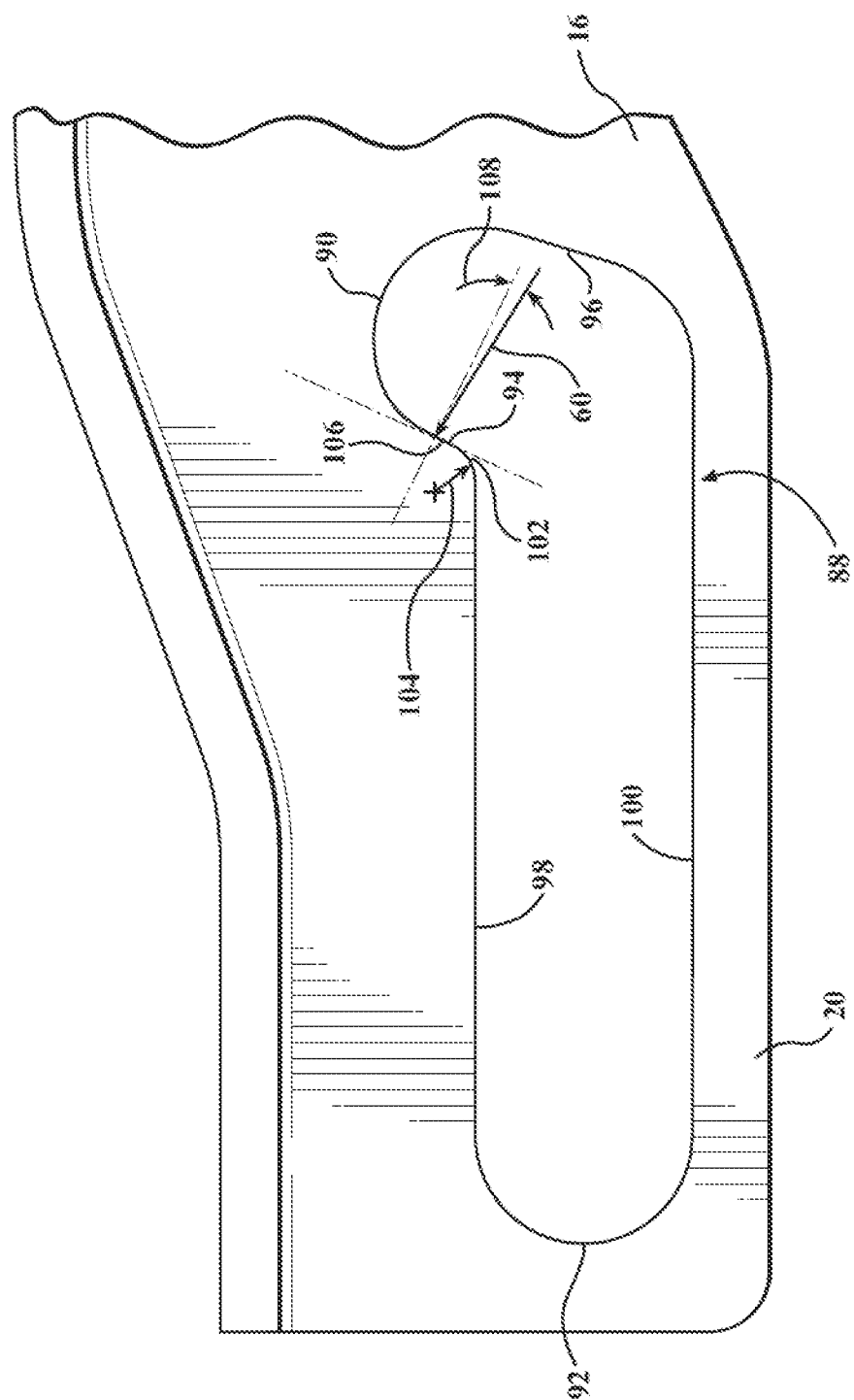

ENERGY ABSORBING HEADLAMP ASSEMBLY AND A RESETTABLE HEADLAMP ASSEMBLY

TECHNICAL FIELD

The present disclosure relates to an energy absorbing headlamp assembly and a resettable headlamp assembly.

BACKGROUND

Generally, vehicles utilize headlights to assist in providing visibility to a user under various conditions.

SUMMARY

The present disclosure provides an energy absorbing headlamp assembly including a first component and a headlamp assembly supported by the first component. The headlamp assembly is movable between an initial position and a displaced position relative to the first component. The energy absorbing headlamp assembly also includes an energy absorbing device operatively coupled to the headlamp assembly and the first component to allow movement of the headlamp assembly from the initial position to the displaced position to absorb energy when a first force is applied to the headlamp assembly. The energy absorbing device includes a link and a biasing mechanism coupled to each other such that the biasing mechanism continuously applies a second force to the link to bias the link to a first position when the headlamp assembly is in the initial position and bias the link to a second position when the headlamp assembly is in the displaced position.

The present disclosure also provides a resettable headlamp assembly including a first component and a headlamp assembly supported by the first component. The headlamp assembly is movable between an initial position and a displaced position relative to the first component. The resettable headlamp assembly includes an energy absorbing device operatively coupled to the headlamp assembly and the first component to allow movement of the headlamp assembly from the initial position to the displaced position to absorb energy when a first force is applied to the headlamp assembly and allow movement of the headlamp assembly from the displaced position back to the initial position when the first force is removed to reset the headlamp assembly back to the initial position.

Therefore, the headlamp assembly is movable to absorb energy when the first force is applied thereto and the headlamp assembly can be reset when the first force is removed.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 8 is a schematic broken side view of the first end of the first component illustrating the slot.

DETAILED DESCRIPTION

Figure 1:
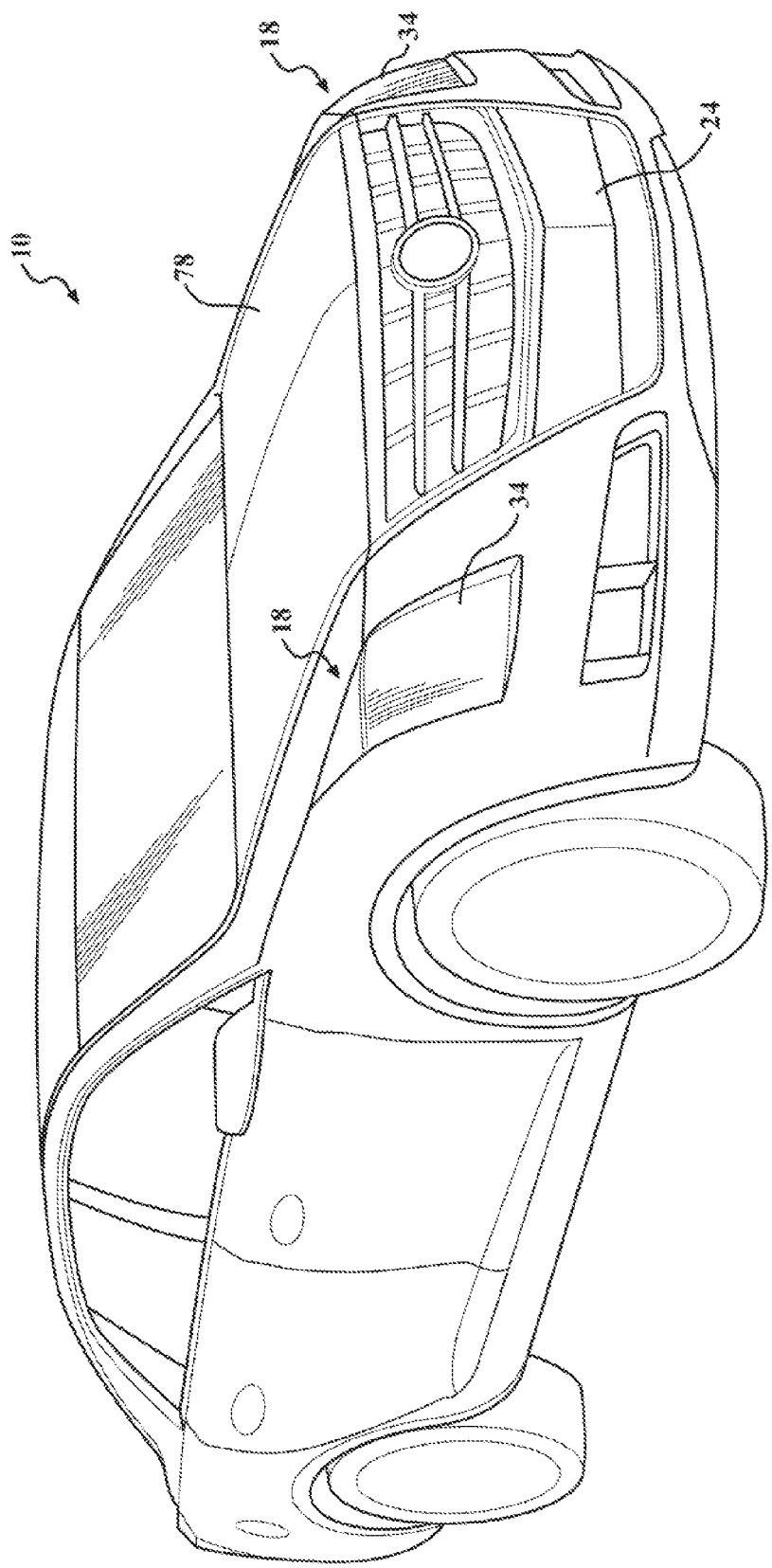
FIG. 1 is a schematic perspective view of a vehicle with a pair of headlamp assemblies in an initial position.

Referring to the Figures, wherein like numerals indicate like or corresponding parts throughout the several views, a vehicle 10 including an energy absorbing headlamp assembly 12 and a resettable headlamp assembly 14 are generally shown in FIG. 1. The assemblies 12, 14 can be useful for vehicles 10, such as automotive vehicles, cars, trucks, motorcycles, etc. It is to be appreciated that the assemblies 12, 14 can also be useful for non-automotive applications including, for example, farm, marine, aviation applications, etc.

Figure 2:
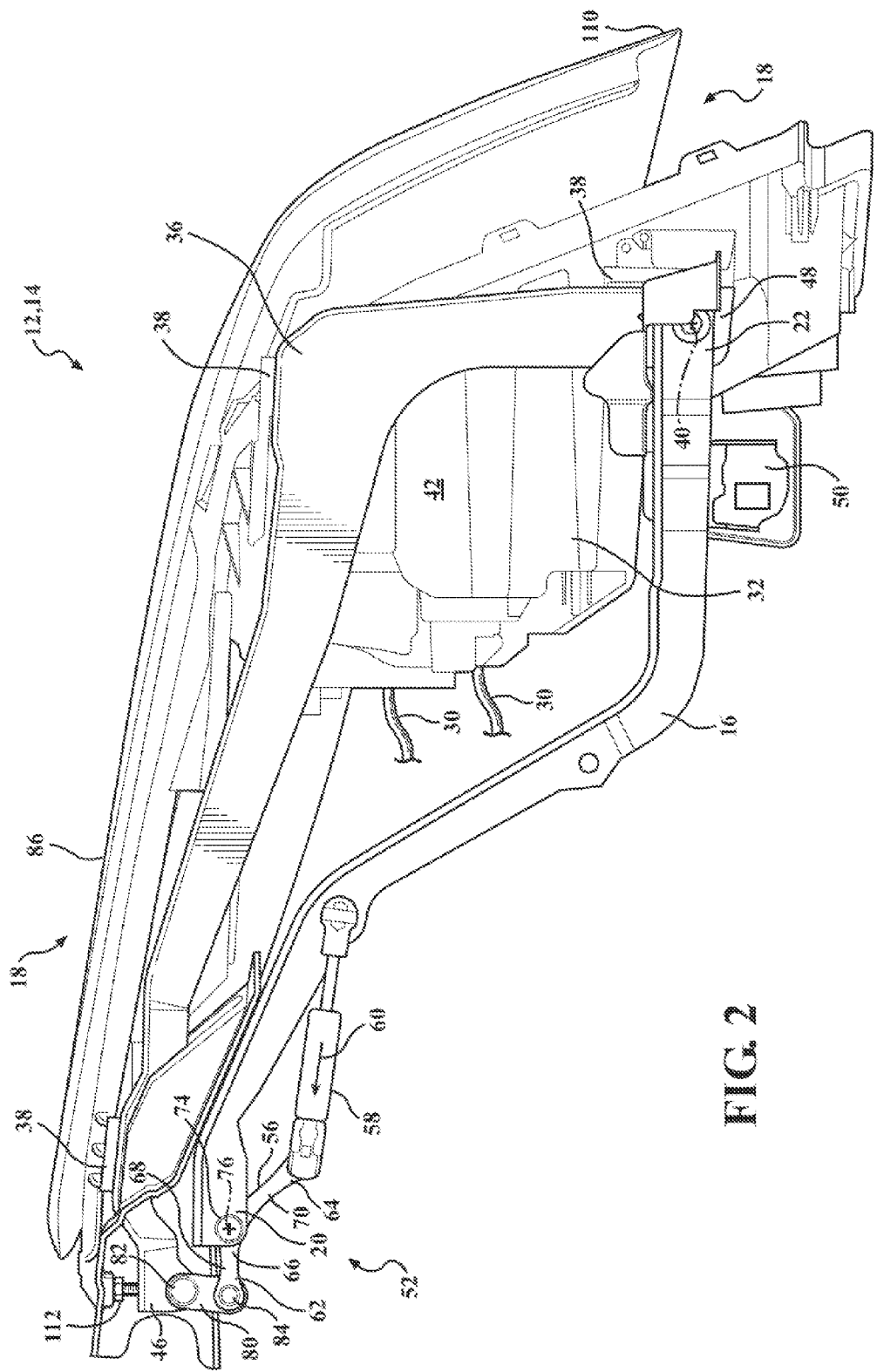
FIG. 2 is a schematic side view of the headlamp assembly in the initial position and an energy absorbing device of a first embodiment including a link in a first position.
Figure 5:
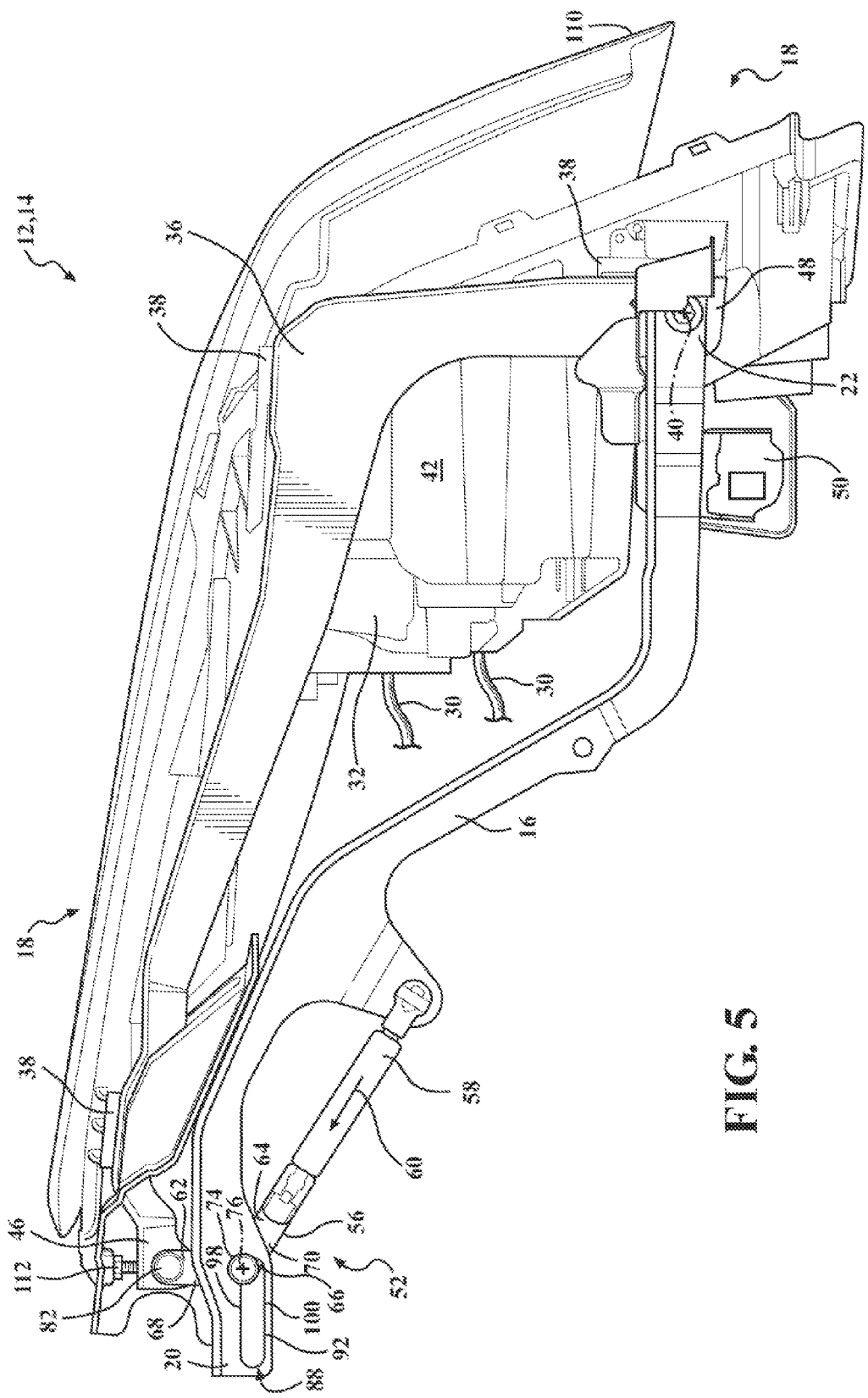
FIG. 5 is a schematic side view of the headlamp assembly in the initial position and an energy absorbing device of a second embodiment including a link in a first position and a first component defining a slot.

Beginning with the energy absorbing headlamp assembly 12, this assembly 12, as best shown in FIGS. 2 and 5, includes a first component 16 and a headlamp assembly 18 supported by the first component 16. Generally, the first component 16 can include a first end 20 and a second end 22 spaced from each other. Specifically, the first component 16 remains stationary relative to the headlamp assembly 18. The first component 16 can be further defined as a frame, a body, a support, a vehicle frame, a chassis or any other suitable fixed or stationary component to support the headlamp assembly 18. Therefore, the first component 16 can be any suitable configuration for supporting the headlamp assembly 18.

Figure 4:
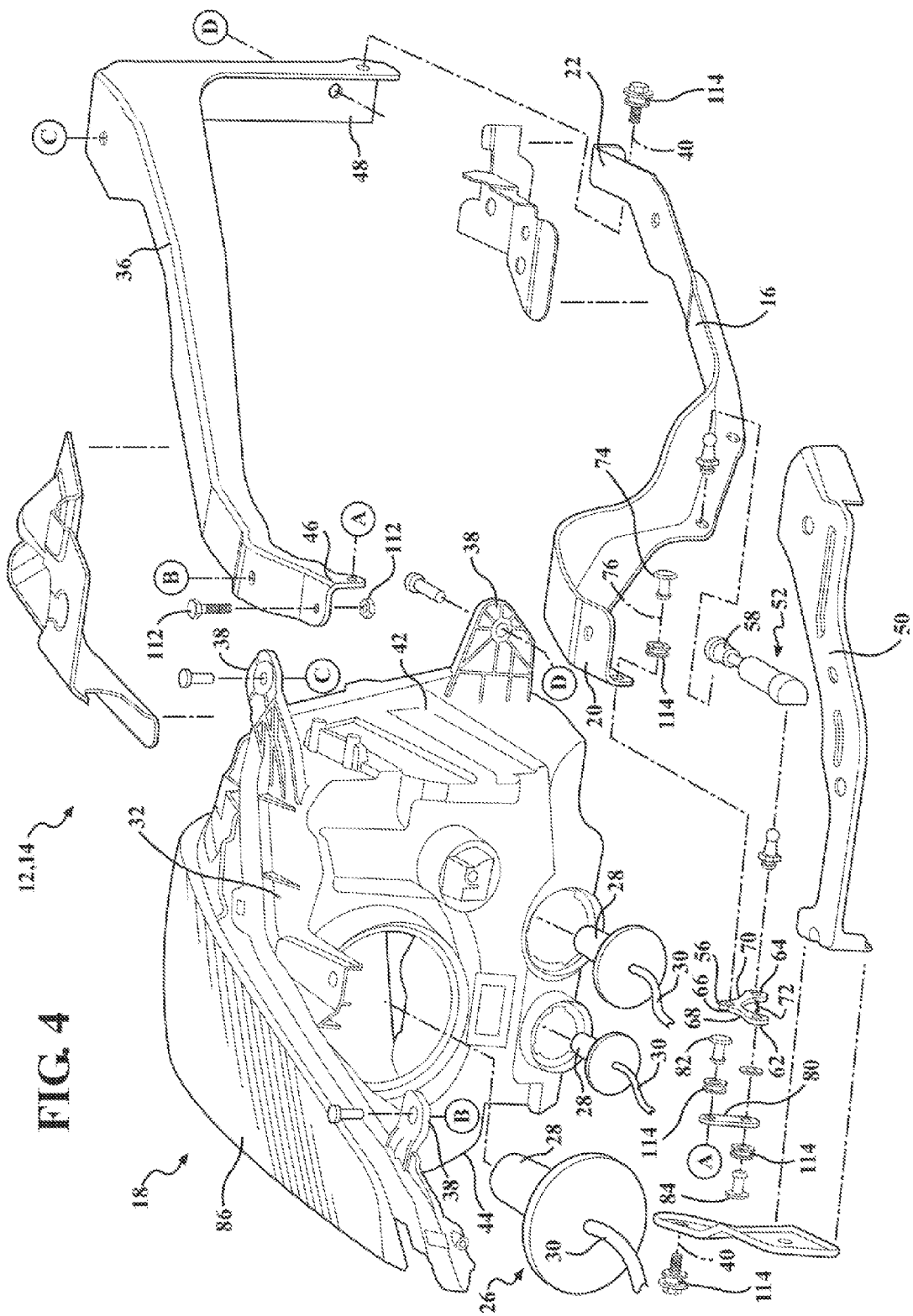
FIG. 4 is a schematic exploded perspective view of an energy absorbing headlamp assembly and a resettable headlamp assembly illustrating the energy absorbing device of the first embodiment.
Figure 7:
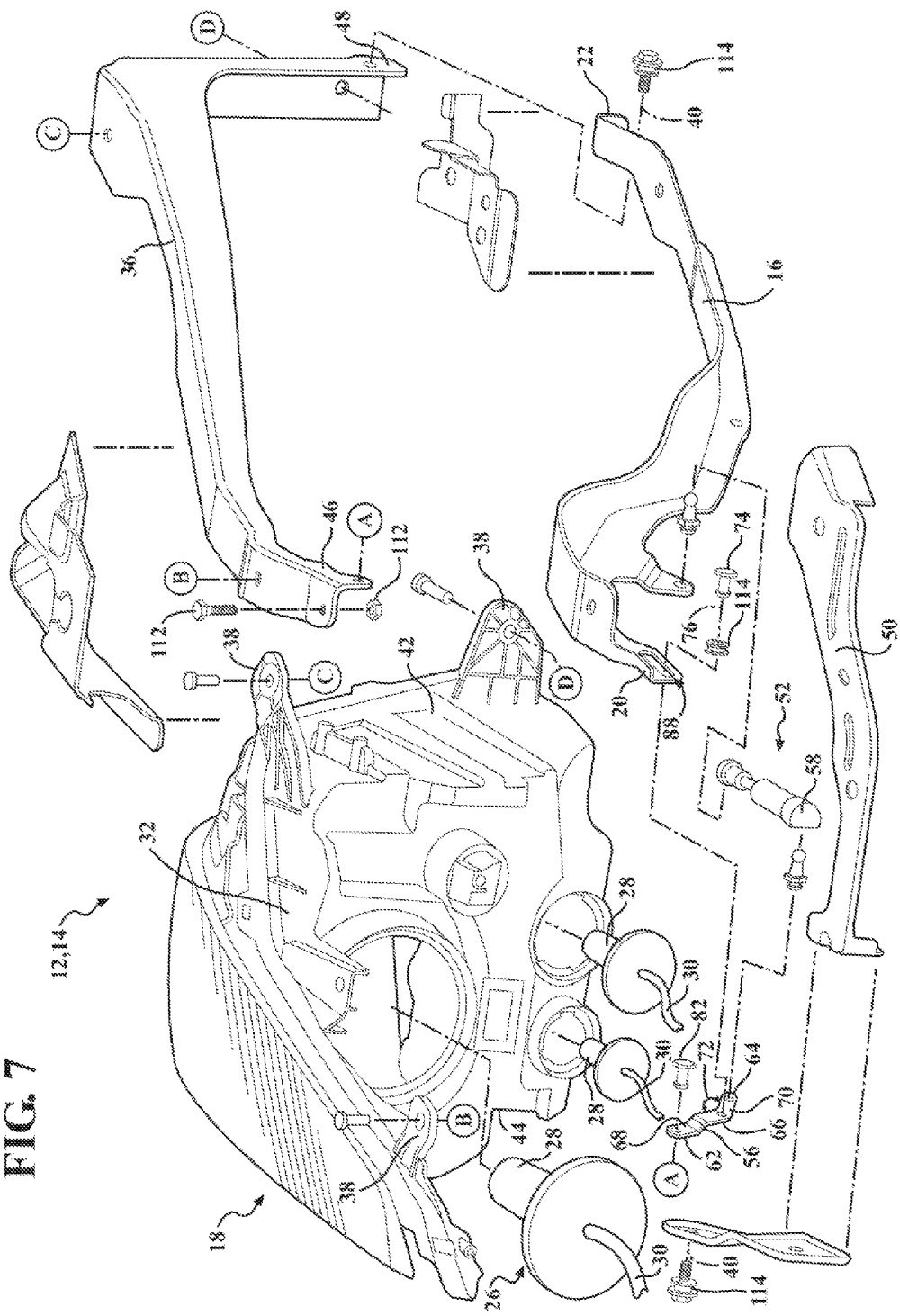
FIG. 7 is a schematic exploded perspective view of the energy absorbing headlamp assembly and the resettable headlamp assembly illustrating the energy absorbing device of the second embodiment.

Generally, the headlamp assembly 18 is coupled to a front end 24 of the vehicle 10 for illuminating an area in front of the vehicle 10 and/or to sides of the vehicle 10 adjacent to the front end 24. Specifically, the headlamp assembly 18 can include a light device 26 (as best shown in FIGS. 4 and 7) for illuminating the area. Therefore, when a user turns the light device 26 on, the light device 26 illuminates the area to improve visibility of that area. The light device 26 can include one or more light bulbs 28, led lights, etc., electrically connected to one or more wire harnesses 30. The wire harnesses 30 are electrically connected to a battery source to supply power or current to the light bulbs 28 to selectively light the bulbs 28. It is to be appreciated that when utilizing a four-wheeled vehicle 10, generally a plurality of headlamp assemblies 18 are utilized as shown in FIG. 1. It is to be appreciated any suitable number of headlamp assemblies 18 can be utilized.

Turning to FIGS. 1, 2 and 5, the headlamp assembly 18 can also include a housing 32, with the light device 26 supported by the housing 32. In certain embodiments, the housing 32 can define a pocket for receiving the light device 26. Furthermore, the headlamp assembly 18 can include a cover 34 or lens attached to the housing 32 with the light device 26 therein. In other words, the housing 32 and the cover 34 cooperate to shield the light device 26 from debris and/or weather, such as rain, snow, ice, etc., while allowing the light device 26 to illuminate the area through the cover 34. It is to be appreciated that mirrors or any other suitable components can be disposed in the pocket to assist the light device 26 in illuminating the area.

Referring to FIGS. 2-7, the headlamp assembly 18 can include a bracket 36, with the housing 32 and the bracket 36 attached to each other such that the bracket 36 supports the housing 32. More specifically, as best shown in FIGS. 2, 4, 5 and 7, the housing 32 can include one or more extensions 38 extending therefrom, with the bracket 36 attached to the extensions 38. Therefore, the housing 32 and the bracket 36 are rotatably coupled to the first component 16 about a pivot axis 40. Furthermore, the housing 32 can include an inner side 42 and an outer side 44 spaced from each other along the pivot axis 40, with the bracket 36 attached to one of the inner and outer sides 42, 44. In certain embodiments, the outer side 44 can face a wheel well area of the vehicle 10 and the inner side 42 can face a radiator area or an engine area of the vehicle 10. For example, in FIGS. 2, 3, 5 and 6, the bracket 36 is attached to the inner side 42 of the housing 32 (facing away from the wheel well area).

Additionally, continuing with FIGS. 2, 3, 5 and 6, the bracket 36 can include a first distal end 46 disposed adjacent to the first end 20 of the first component 16 and a second distal end 48 disposed adjacent to the second end 22 of the first component 16. In certain embodiments, the second distal end 48 of the bracket 36 and the second end 22 of the first component 16 are attached to each other at the pivot axis 40. It is to be appreciated that the bracket 36 can be any suitable configuration to cooperate with the housing 32.

Furthermore, in certain embodiments, as best shown in FIGS. 4 and 7, the headlamp assembly 18 can include a brace 50 or cross-bar supporting the housing 32 between the inner and outer sides 42, 44. In certain embodiments, the brace 50 can be attached to the outer side 44 of the housing 32 and the bracket 36. It is to be appreciated that the brace 50 can be attached to the inner and outer sides 42, 44 of the housing 32.

Figure 3:
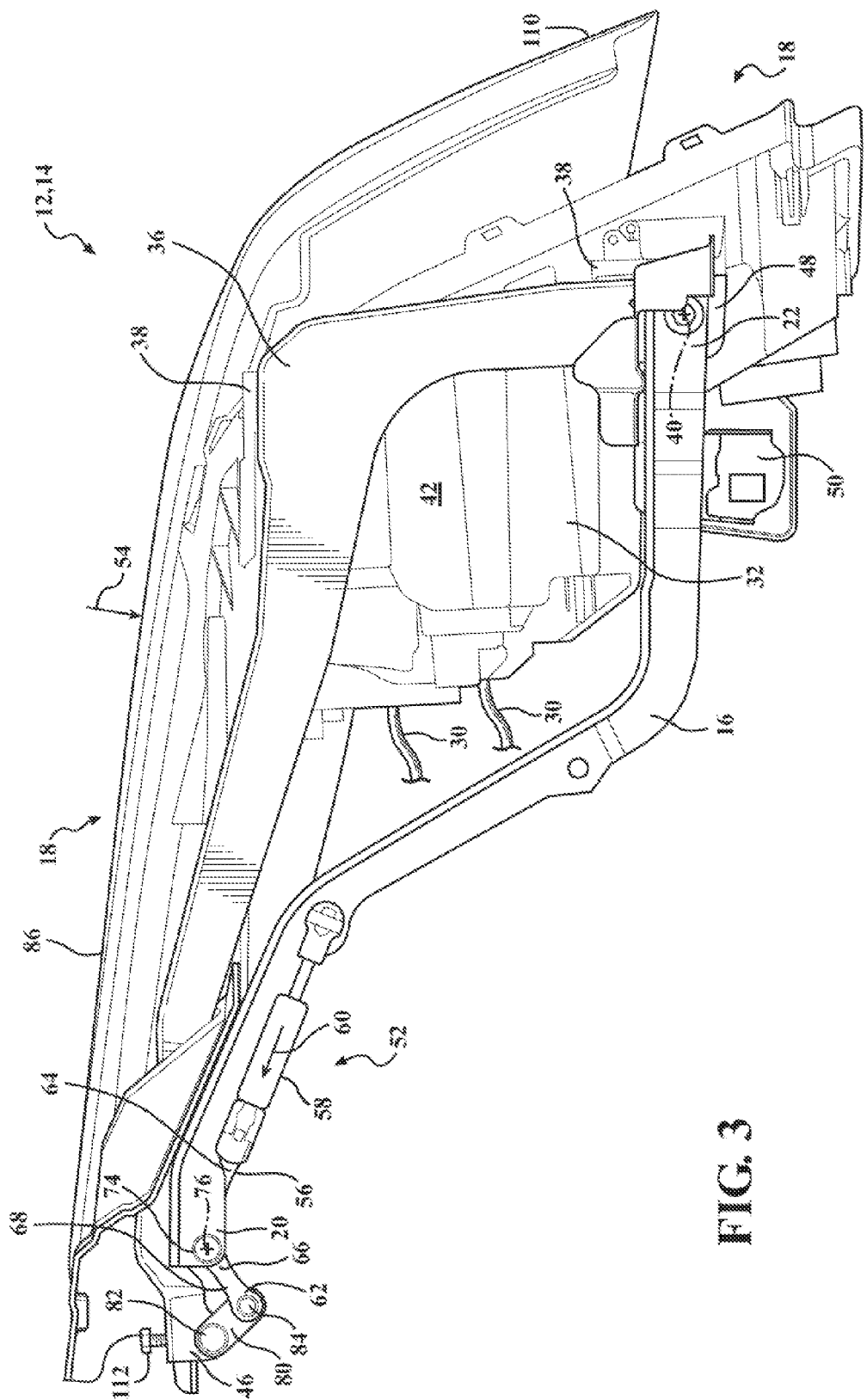
FIG. 3 is a schematic side view of the headlamp assembly in a displaced position and the energy absorbing device of the first embodiment having the link in a second position.
Figure 6:
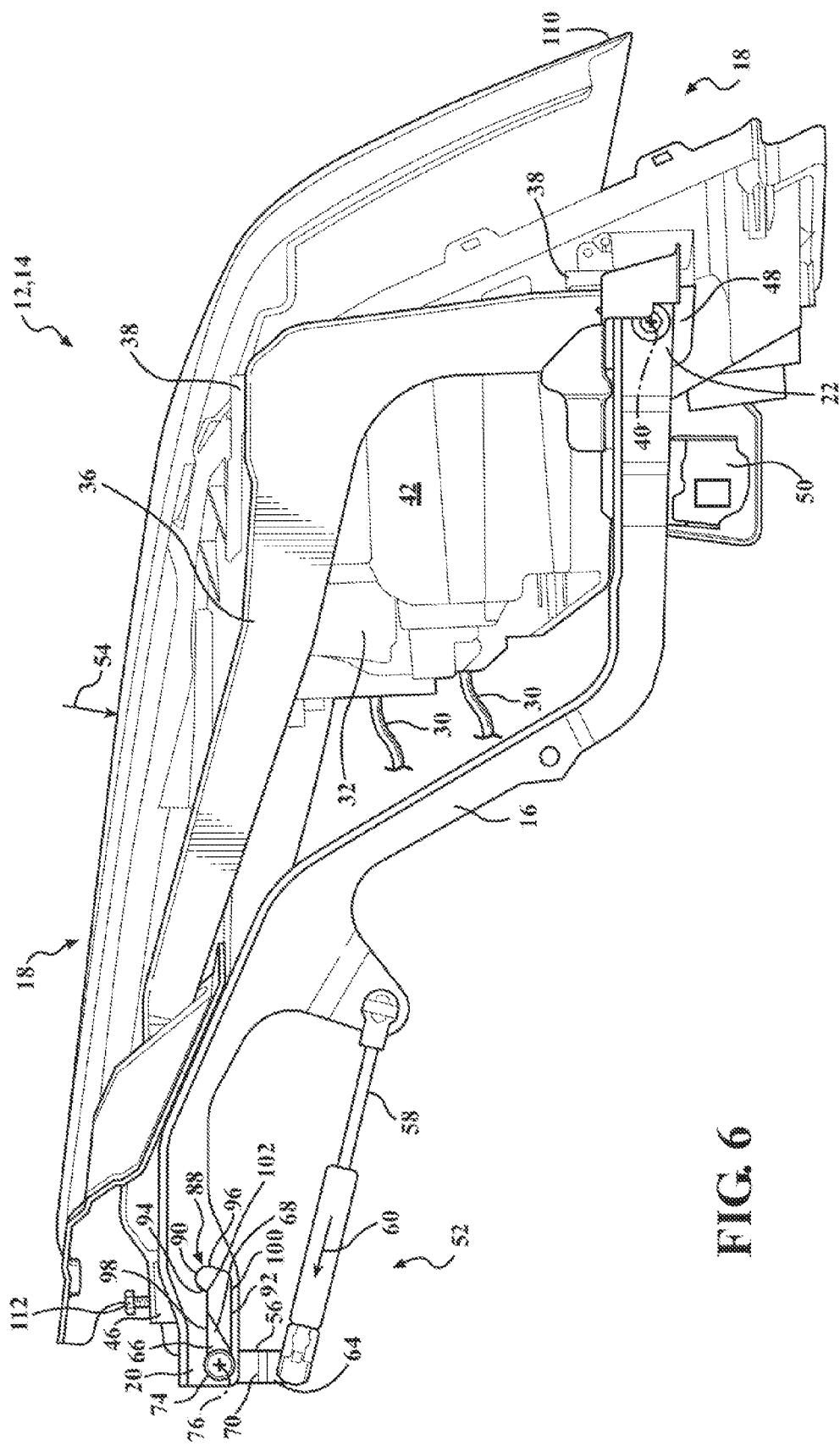
FIG. 6 is a schematic side view of the headlamp assembly in the displaced position and the energy absorbing device of the second embodiment having the link in a second position.

Generally, the headlamp assembly 18 is movable between an initial position and a displaced position relative to the first component 16. More specifically, the housing 32 and the light device 26 are rotatable between the initial and displaced positions. Furthermore, the housing 32 and the bracket 36 are rotatable together about the pivot axis 40 between the initial and displaced positions. In other words, the housing 32 and the bracket 36 are commonly rotatable about the pivot axis 40. Additionally, the brace 50 is rotatable about the pivot axis 40 with the housing 32 and the bracket 36. Simply stated, the headlamp assembly 18, such as the housing 32, the bracket 36, the brace 50 and the light device 26, are rotatable as a unit between the initial and displaced positions. The initial position of the headlamp assembly 18 is shown in FIGS. 1, 2 and 5 and the displaced position of the headlamp assembly 18 is shown in FIGS. 3 and 6.

Referring to FIGS. 2 and 5, the energy absorbing headlamp assembly 12 further includes an energy absorbing device 52 operatively coupled to the headlamp assembly 18 and the first component 16 to allow movement of the headlamp assembly 18 from the initial position to the displaced position to absorb energy when a first force 54 is applied to the headlamp assembly 18. The first force 54 is identified as an arrow in FIGS. 3 and 6 for illustrative purposes only. FIGS. 2-4 illustrates one embodiment of the energy absorbing device 52 and the first component 16. In addition, FIGS. 5-8 illustrates another embodiment of the energy absorbing device 52 and the first component 16. Both embodiments of the energy absorbing devices 52 and the first components 16 are discussed below.

Turning to FIGS. 2 and 5, the energy absorbing device 52 of both embodiments can include a link 56 and a biasing mechanism 58 coupled to each other such that the biasing mechanism 58 continuously applies a second force 60 to the link 56 to bias the link 56 to a first position when the headlamp assembly 18 is in the initial position and bias the link 56 to a second position when the headlamp assembly 18 is in the displaced position. The second force 60 is identified as an arrow in FIGS. 2, 3, 5, 6 and 8 for illustrative purposes only. Generally, the link 56 is movably coupled to the bracket 36. The link 56 is shown in the first position in FIGS. 2 and 5 and the link 56 is shown in the second position in FIGS. 3 and 6. Furthermore, the link 56 of both embodiments of the energy absorbing device 52 can be further defined as a bell crank as discussed further below. In addition, the orientation of the link 56 can change for the different embodiments of the energy absorbing devices 52 (compare FIGS. 2 and 5).

Referring to FIGS. 4 and 7, in both embodiments of the energy absorbing device 52, the link 56 includes a first end portion 62, a second end portion 64 and a center portion 66 disposed between the first and second end portions 62, 64. More specifically, the link 56 includes a first arm 68 and a second arm 70 each extending from the center portion 66 in a spaced relationship. The first arm 68 extends to the first end portion 62 and the second arm 70 extends to the second end portion 64. Generally, the first and second arms 68, 70 are angled relative to each other. Therefore, the first and second end portions 62, 64 are angled relative to each other. Specifically, an angle 72 (see FIGS. 4 and 7) between the first and second arms 68, 70 is less than 180° (degrees) or greater than 180° (degrees). In other words, the first and second arms 68, 70 are not substantially flat or in line with each other. The first and second arms 68, 70, and thus the first and second end portions 62, 64, being angled relative to each other further define the bell crank.

The center portion 66 is coupled to the first component 16 by a pin 74 such that the link 56 moves relative to the first component 16 during movement between the first and second positions. Generally, the biasing mechanism 58 is attached to the second end portion 64 of the link 56 (see FIGS. 2 and 5). Therefore, the link 56 of both embodiments of the energy absorbing device 52 can be further defined as the bell crank rotatable relative to the pin 74 between the first and second positions.

In the embodiment of FIGS. 2-4, the center portion 66 of the link 56 is rotatably attached to the first end 20 of the first component 16. More specifically, the pin 74 is attached to the first end 20 and defines a first axis 76, with the link 56 rotatable about the first axis 76 relative to the first end 20 of the first component 16. Generally, the first axis 76 is spaced offset from and substantially parallel to the pivot axis 40. In this embodiment, the biasing mechanism 58 is attached to the second end portion 64 of the link 56 and attached to the first component 16 between the first and second ends 20, 22. Before applying the first force 54 to the headlamp assembly 18, the second force 60 applied to the link 56 by the biasing mechanism 58 causes an upward force on the link 56 which maintains the link 56 in the first position and the headlamp assembly 18 in the initial position. Specifically, before applying the first force 54, the direction of the second force 60 applied to the link 56 is below the first axis 76 of the pin 74 which biases the link 56 in a clockwise direction relative to the first axis 76 which causes the upward force on the link 56, and thus the headlamp assembly 18. Biasing the link 56 in the clockwise direction causes the first arm 68 to bias upwardly toward a hood 78 of the vehicle 10. It is to be appreciated that various components can be rearranged such that the link 56 could be biased in a counter-clockwise direction relative to the first axis 76 to cause the upward force on the link 56.

Continuing with the embodiment of FIGS. 2-4, the energy absorbing device 52 can include a junction member 80 movably attached to the first distal end 46 of the bracket 36 and the first end portion 62 of the link 56 to operatively couple together the energy absorbing device 52 and the headlamp assembly 18. Therefore, the link 56 is coupled to the bracket 36 through the junction member 80. Said differently, the link 56 is indirectly attached to the bracket 36 through the junction member 80. Specifically, the link 56 is coupled to the headlamp assembly 18 through the junction member 80. The junction member 80 is attached to the first distal end 46 of the bracket 36 by a first pivot 82 and the junction member 80 is attached to the first end portion 62 of the link 56 by a second pivot 84. Therefore, the junction member 80 can rotate relative to the first and second pivots 82, 84 in response to movement of the headlamp assembly 18. As such, before applying the first force 54 to the headlamp assembly 18, the second force 60 applied to the link 56 by the biasing mechanism 58 causes the upward force through the link 56 to the junction member 80 which maintains the headlamp assembly 18 in the initial position. The link 56 can be further defined as the bell crank rotatable relative to the first component 16 about the pin 74 between the first and second positions. It is to be appreciated that the angle 72 between the arms 68, 70 of the bell crank can be adjusted as desired.

Generally, to rotate the headlamp assembly 18 from the initial position to the displaced position for this first embodiment, the second force 60 applied to the link 56 by the biasing mechanism 58 has to be overcome. Therefore, when the first force 54 is greater than the second force 60, the headlamp assembly 18 will rotate about the pivot axis 40 to the displaced position. For example, when an object strikes a top side 86 of the headlamp assembly 18 with the first force 54 greater than the second force 60, the headlamp assembly 18 begins to rotate from the initial position to the displaced position away from the impact to absorb energy. As the headlamp assembly 18 rotates toward the displaced position, the junction member 80 and the link 56 begin to rotate (compare FIGS. 2 and 3). Rotation of the link 56 causes the biasing mechanism 58 to bias the link 56 from the first position to the second position and thus continue to rotate the headlamp assembly 18 to the displaced position. In other words, rotation of the link 56 causes the direction of the second force 60 applied to the link 56 to change such that the second force 60 crosses over the pin 74 which causes the biasing mechanism 58 to bias the link 56 to the second position. Simply stated, the direction of the second force 60 applied by the biasing mechanism 58 changes to rotate the link 56 counter-clockwise relative to the first axis 76 from the first position to the second position. This counter-clockwise rotation causes the first arm 68 to pull the junction member 80 downwardly and the first distal end 46 of the bracket 36 downwardly which rotates the housing 32 and the bracket 36 about the pivot axis 40. The headlamp assembly 18 rotates about the pivot axis 40 such that the top side 86 of the housing 32 rotates away from the first force 54 applied by the object. For example, the top side 86 rotates downwardly relative to the hood 78 of the vehicle 10. The biasing mechanism 58 will continue to apply the second force 60 to the link 56 to maintain the link 56 in the second position and thus maintain the headlamp assembly 18 in the displaced position after the first force 54 is removed. Therefore, the biasing mechanism 58 continuously applies the second force 60 to prevent the headlamp assembly 18 from rebounding back upwardly toward the hood 78 when the first force 54 is removed. It is to be appreciated that the second force 60 applied by the biasing mechanism 58 can be increased or decreased as desired during assembly of the vehicle 10 which correspondingly increases or decreases the first force 54 to be applied to cause rotation of the headlamp assembly 18. Furthermore, the second force 60 applied by the biasing mechanism 58 is large enough to maintain the headlamp assembly 18 in the initial position during operation of the vehicle 10 in light of the road conditions before the first force 54 is applied. In summary, rotating the headlamp assembly 18 away from the object absorbs energy to reduce the impact.

Turning to the embodiment of FIGS. 5-7, the link 56 is rotatably attached to the first distal end 46 of the bracket 36. In this embodiment, the link 56 is directly attached to the bracket 36 by the first pivot 82. As such, the first end portion 62 of the link 56 is secured to the first distal end 46 of the bracket 36 by the first pivot 82. Therefore, for this embodiment, the junction member 80 and the second pivot 84 have been eliminated. Furthermore, in this embodiment, the orientation of the link 56 has changed as compared to the embodiment of FIG. 2-4. The link 56 in this embodiment can be further defined as the bell crank rotatable about the first axis 76 of the pin 74 and movable in the slot 88 relative to the first component 16.

In addition, for this embodiment (FIGS. 5-8), the first component 16 can define a slot 88 having a first portion 90 and a second portion 92 angled relative to each other. In one embodiment, the first end 20 of the first component 16 defines the slot 88. Therefore, the pin 74 is movably coupled to the first end 20 of the first component 16 within the slot 88, with the link 56 rotatable about the first axis 76 relative to the first end 20 of the first component 16. As compared to the embodiment in FIGS. 2-4, the first component 16 of FIGS. 2-4 does not define the slot 88 in the first end 20. Generally, the length of the slot 88 determines the amount of travel of the link 56.

In the embodiment of FIGS. 5-8, the pin 74 is movably disposed in the slot 88 such that the pin 74 is disposed in the first portion 90 of the slot 88 when the link 56 is in the first position corresponding to the headlamp assembly 18 being in the initial position and the pin 74 is disposed in the second portion 92 of the slot 88 when the link 56 is in the second position corresponding to the headlamp assembly 18 being in the displaced position. Specifically, the link 56 rotates about the first axis 76 and slides along the slot 88 (compare FIGS. 5 and 6). Generally, in this embodiment, the first axis 76 of the pin 74 is spaced offset from and substantially parallel to the pivot axis 40.

Turning to FIGS. 5, 6 and 8, the first portion 90 of the slot 88 presents a first side 94 and a second side 96 facing each other in a spaced relationship. Similarly, the second portion 92 presents a first side 98 and a second side 100 facing each other in a spaced relationship. Generally, the pin 74 engages the first side 94 of the first portion 90 when the link 56 is in the first position (see FIG. 5) and the pin 74 engages the first side 98 of the second portion 92 when the link 56 is in the second position (see FIG. 6).

Continuing with the embodiment of FIGS. 5-8, the first and second portions 90, 92 are angled relative to each other to present an arcuate portion 102 therebetween, with the pin 74 engaging the arcuate portion 102 as the link 56 moves between the first and second positions. More specifically, the arcuate portion 102 is disposed between the first sides 94, 98 of the first and second portions 90, 92 of the slot 88. Specifically, the arcuate portion 102 presents a radius 104 (see FIG. 8) which the pin 74 moves over when moving between the first and second positions. The radius 104 determines how much the first and second portions are angled relative to each other.

As best shown in FIG. 8, the first side 94 of the first portion 90 presents a first wall 106 substantially flat and disposed adjacent to the arcuate portion 102, with the pin 74 engaging the first wall 106 to maintain the link 56 in the first position when the headlamp assembly 18 is in the initial position. In this embodiment, the biasing mechanism 58 is attached to the second end portion 64 of the link 56 and attached to the first component 16 between the first and second ends 20, 22. Before applying the first force 54 to the headlamp assembly 18, the second force 60 applied to the link 56 by the biasing mechanism 58 causes an upward force on the link 56 which maintains the link 56 in the first position and the headlamp assembly 18 in the initial position. Specifically, before applying the first force 54, the direction of the second force 60 applied to the link 56 pushes the pin 74 against the first wall 106 which biases the link 56 in a counter-clockwise direction relative to the first axis 76 which causes the upward force on the first arm 68, and thus the headlamp assembly 18. Biasing the link 56 in the counter-clockwise direction causes the first arm 68 to bias upwardly toward the hood 78 of the vehicle 10 and maintain the headlamp assembly 18 in the initial position. The second force 60 is applied to the first wall 106 at an angle 108 relative to the first wall 106 (see FIG. 8). For example, in one embodiment, the angle 108 of the second force 60 can be of from about negative 1° (degrees) to about negative 10° (degrees). As another example, in another embodiment, the angle 108 of the second force 60 can be of from about negative 3° (degrees) to about negative 7° (degrees). As yet another example, in yet another embodiment, the angle 108 of the second force 60 can be of from about negative 5° (degrees). It is to be appreciated that various components can be rearranged such that the link 56 could be biased in a clockwise direction relative to the first axis 76 to cause the upward force on the link 56 and rearranged such that the angle 108 of the second force 60 can be different than discussed above. Additionally, it is to be appreciated that the angle 72 between the arms 68, 70 of the bell crank can be adjusted as desired.

Generally, to rotate the headlamp assembly 18 from the initial position to the displaced position for this second embodiment, the second force 60 applied to the link 56 by the biasing mechanism 58 has to be overcome. Therefore, when the first force 54 is greater than the second force 60, the headlamp assembly 18 will rotate about the pivot axis 40 to the displaced position. For example, when an object strikes the headlamp assembly 18 with the first force 54 greater than the second force 60, the headlamp assembly 18 begins to rotate from the initial position to the displaced position away from the impact to absorb energy. As the headlamp assembly 18 rotates toward the displaced position, the link 56 begins to rotate about the first axis 76 and slide along the slot 88 (compare FIGS. 5 and 6). Rotation of the link 56 causes the biasing mechanism 58 to bias the link 56 from the first position to the second position and thus continue to rotate the headlamp assembly 18 to the displaced position. In other words, rotation of the link 56 causes the direction of second force 60 applied to the link 56 to change such that the second force 60 crosses over the radius 104 of the arcuate portion 102 which causes the biasing mechanism 58 to bias the link 56 to the second position. Simply stated, the direction of the second force 60 applied by the biasing mechanism 58 changes to rotate the link 56 clockwise relative to the first axis 76 from the first position to the second position. This clockwise rotation causes the first arm 68 to pull the first distal end 46 of the bracket 36 downwardly which rotates the housing 32 and the bracket 36 about the pivot axis 40. The headlamp assembly 18 rotates about the pivot axis 40 such that the top side 86 of the housing 32 rotates away from the first force 54 applied by the object. For example, the top side 86 rotates downwardly relative to the hood 78 of the vehicle 10. The biasing mechanism 58 will continue to apply the second force 60 to the link 56 to maintain the link 56 in the second position and thus maintain the headlamp assembly 18 in the displaced position after the first force 54 is removed. Therefore, the biasing mechanism 58 continuously applies the second force 60 to prevent the headlamp assembly 18 from rebounding back upwardly toward the hood 78 when the first force 54 is removed. It is to be appreciated that the second force 60 applied by the biasing mechanism 58 can be increased or decreased as desired during assembly of the vehicle 10 which correspondingly increases or decreases the first force 54 to be applied to cause rotation of the headlamp assembly 18. For example, the second force 60 can be changed by changing the angle 108 that the second force 60 is applied to the first wall 106. Furthermore, the second force 60 applied by the biasing mechanism 58 is large enough to maintain the headlamp assembly 18 in the initial position during operation of the vehicle 10 in light of the road conditions before the first force 54 is applied. In summary, rotating the headlamp assembly 18 away from the object absorbs energy to reduce the impact.

Turning to the resettable headlamp assembly 14, this assembly 14 can include all of the components discussed above for the energy absorbing headlamp assembly 12. Therefore, the features discussed above will not be re-discussed in detail below. Generally, the resettable headlamp assembly 14 allows the headlamp assembly 18 to be reset back to the initial position when the first force 54 is removed. As such, the energy absorbing device 52, as discussed above, can be reset to move the headlamp assembly 18 back to the initial position. Specifically, the energy absorbing device 52 discussed herein performs multiple functions, such as absorbing energy by moving the headlamp assembly 18 away from the impact and resetting the headlamp assembly 18 after the impact. As discussed above, there are two embodiments of the energy absorbing device 52 and each of these embodiments will be discussed in relation to resetting the headlamp assembly 18.

As discussed above, the headlamp assembly 18 is supported by the first component 16 and is movable between the initial position and the displaced position relative to the first component 16. As also discussed above, the energy absorbing device 52 is operatively coupled to the headlamp assembly 18 and the first component 16 to allow movement of the headlamp assembly 18 from the initial position to the displaced position to absorb energy when the first force 54 is applied to the headlamp assembly 18. Furthermore, the energy absorbing device 52 allows movement of the headlamp assembly 18 from the displaced position back to the initial position when the first force 54 is removed to reset the headlamp assembly 18 back to the initial position. Simply stated, the energy absorbing device 52 can be reset to support the headlamp assembly 18 back in the initial position.

Generally, as discussed above, both embodiments of the energy absorbing device 52 can include the link 56 and the biasing mechanism 58 such that the biasing mechanism 58 continuously applies the second force 60 to the link 56 to bias the link 56 to the first position when the headlamp assembly 18 is in the initial position and bias the link 56 to the second position when the headlamp assembly 18 is in the displaced position. Furthermore, the biasing mechanism 58 applies the second force 60 as the link 56 moves from the second position back to the first position to reset the headlamp assembly 18 in the initial position. For example, the biasing mechanism 58 can decompress as the link 56 moves from the first position to the second position and the biasing mechanism 58 can be recompressed as the link 56 moves from the second position back to the first position to reset the headlamp assembly 18 in the initial position. Alternatively, the biasing mechanism 58 can compress as the link 56 moves from the first position to the second position and the biasing mechanism 58 can be decompressed as the link 56 moves from the second position back to the first position to reset the headlamp assembly 18 in the initial position. Generally, the biasing mechanism 58 is attached to the second end portion 64 of the link 56 and attached to the first component 16 to continuously apply the second force 60 to the link 56.

Generally, to reset the headlamp assembly 18 from the displaced position back to the initial position, the headlamp is rotated about the pivot axis 40 back to the initial position. Therefore, for example, a third force can be applied to a front side 110 or bottom side of the headlamp assembly 18, with the third force being greater than the second force 60. As such, for illustrative purposes only, if the headlamp assembly 18 rotated counter-clockwise when the first force 54 was applied, the headlamp assembly 18 will be rotated clockwise when the third force is applied.

For the first embodiment of the energy absorbing device 52 (see FIG. 2-4), as the headlamp assembly 18 is rotated back, the link 56 is rotated from the second position back to the first position which moves the junction member 80 and the bracket 36 back to their initial positions. Specifically, the link 56 rotates about the first axis 76, the junction member 80 rotates about the first and second pivots 82, 84, and the bracket 36 and the housing 32 rotate about the pivot axis 40. For example, the link 56 can be rotated clockwise relative to the first axis 76 back to the first position. When the link 56 returns to the first position, the second force 60 is applied to the link 56 by the biasing mechanism 58 to again present the upward force on the link 56 which maintains the link 56 in the first position and the headlamp assembly 18 back in the initial position.

For the second embodiment of the energy absorbing device 52 (see FIGS. 5-8), as the headlamp assembly 18 is rotated back, the link 56 slides along the second portion 92 of the slot 88 and rotates about the first axis 76. For example, the link 56 can be rotated counter-clockwise relative to the first axis 76 back to the first position. When the link 56 returns to the first position, the pin 74 again engages the first wall 106 of the first portion 90 to maintain the headlamp assembly 18 in the initial position. As such, the second force 60 is applied to the link 56 by the biasing mechanism 58 to again present the upward force on the first arm 68, and thus the headlamp assembly 18.

The biasing mechanism 58 for either of the assemblies 12, 14 can be further defined as a gas piston device attached to the first component 16 and the link 56, and more specifically, attached to the first component 16 and the second end portion 64 of the link 56. The gas piston device can be commonly referred to as a gas strut. It is to be appreciated that the biasing mechanism 58 for either of the assemblies 12, 14 can be further defined as a coil spring, a torsion spring, a compression spring, an extension spring, a leaf spring, a push spring, a pull spring or any other suitable biasing mechanism. For example, a pull type of coil spring can be attached to the vehicle 10, such as a fixed or stationary component, and the center portion 66 of the link 56 of the energy absorbing device 52 of FIGS. 2-4 to bias the link 56. As another example, a pull type of coil spring can be attached to the vehicle 10, such as a fixed or stationary component, and the second end portion 64 of the link 56 of the energy absorbing device 52 of FIGS. 5-7 to bias the link 56.

It is to be appreciated that the assemblies 12, 14 discussed herein can include other features as illustrated in the various Figures. For example, the assemblies 12, 14 can include an adjustment mechanism 112 attached to the first distal end 46 of the bracket 36 to provide small incremental adjustments of the top side 86 of the headlamp assembly 18 relative to the hood 78. The adjustment mechanism 112 compensates for tolerance differences of various parts such that the top side 86 of the headlamp assembly 18 and the hood 78 appear substantially flush for aesthetic purposes. The adjustment mechanism 112 can be a threaded screw and a nut, as best shown in FIGS. 4 and 7, or any other suitable adjustment mechanism. As another example, one or more bushings 114 can be utilized, as also best shown in FIGS. 4 and 7.

While the best modes for carrying out the disclosure have been described in detail, those familiar with the art to which this disclosure relates will recognize various alternative designs and embodiments for practicing the disclosure within the scope of the appended claims.

The invention claimed is:

1. An energy absorbing headlamp assembly, the assembly comprising:
    a first component;
    a headlamp assembly supported by the first component and movable between an initial position and a displaced position relative to the first component, with the headlamp assembly including a housing movable between the initial and displaced positions;
    an energy absorbing device operatively coupled to the headlamp assembly and the first component to allow movement of the headlamp assembly from the initial position to the displaced position to absorb energy when a first force is applied to the headlamp assembly; and
    wherein the energy absorbing device includes a link and a biasing mechanism coupled to each other such that the biasing mechanism continuously applies a second force to the link to bias the link to a first position when the headlamp assembly is in the initial position and bias the link to a second position when the headlamp assembly is in the displaced position; wherein the link is movably coupled to the first component and spaced from the housing such that the housing moves between the initial and displaced positions in a spaced relationship from the movement of the link relative to the first component.

2. An assembly as set forth in claim 1 wherein the link includes a first end portion, a second end portion and a center portion disposed between the first and second end portions, with the center portion coupled to the first component by a pin such that the link moves relative to the first component during movement between the first and second positions, and with the biasing mechanism attached to the second end portion of the link.

3. An assembly as set forth in claim 2 wherein the headlamp assembly includes a bracket attached to the housing such that the bracket supports the housing, with the housing and the bracket rotatably coupled to the first component about a pivot axis, and with the link movably coupled to the bracket.

4. An assembly as set forth in claim 2 wherein the biasing mechanism is further defined as a gas piston device attached to the first component and the second end portion of the link.

5. An assembly as set forth in claim 1 wherein the headlamp assembly includes a bracket attached to the housing such that the bracket supports the housing, with the housing and the bracket rotatably coupled to the first component about a pivot axis, and wherein the housing includes an inner side and an outer side spaced from each other along the pivot axis, with the bracket attached to one of the inner and outer sides, and wherein the housing includes a brace supporting the housing between the inner and outer sides.

6. An assembly as set forth in claim 2 wherein the first component includes a first end and a second end spaced from each other, with the center portion of the link rotatably attached to the first end of the first component, and with the biasing mechanism attached to the second end portion of the link and attached to the first component between the first and second ends.

7. An assembly as set forth in claim 6 wherein the headlamp assembly includes a bracket attached to the housing such that the bracket supports the housing, with the housing and the bracket rotatably coupled to the first component about a pivot axis.

8. An assembly as set forth in claim 7 wherein the bracket includes a first distal end disposed adjacent to the first end of the first component and a second distal end disposed adjacent to the second end of the first component, and wherein the energy absorbing device includes a junction member movably attached to the first distal end of the bracket and the first end portion of the link to operatively couple together the energy absorbing device and the headlamp assembly.

9. An assembly as set forth in claim 2 wherein the link is further defined as a bell crank rotatable relative to the pin between the first and second positions.

10. An assembly as set forth in claim 2 wherein the first component defines a slot having a first portion and a second portion angled relative to each other, with the pin movably disposed in the slot such that the pin is disposed in the first portion of the slot when the link is in the first position corresponding to the headlamp assembly being in the initial position and the pin is disposed in the second portion of the slot when the link is in the second position corresponding to the headlamp assembly being in the displaced position.

11. An assembly as set forth in claim 10 wherein the first and second portions are angled relative to each other to present an arcuate portion therebetween, with the pin engaging the arcuate portion as the link moves between the first and second positions.

12. An assembly as set forth in claim 11 wherein the first component includes a first end and a second end spaced from each other, and wherein the first end of the first component defines the slot, with the first portion of the slot presenting a first side and a second side facing each other in a spaced relationship, and with the second portion presenting a first side and a second side facing each other in a spaced relationship, and wherein the pin engages the first side of the first portion when the link is in the first position and the pin engages the first side of the second portion when the link is in the second position.

13. An assembly as set forth in claim 12 wherein the arcuate portion is disposed between the first sides of the first and second portions of the slot, and wherein the first side of the first portion presents a first wall substantially flat and disposed adjacent to the arcuate portion, with the pin engaging the first wall to maintain the link in the first position when the headlamp assembly is in the initial position.

14. An assembly as set forth in claim 12 wherein the headlamp assembly includes a bracket attached to the housing such that the bracket supports the housing, with the housing and the bracket rotatably coupled to the first component about a pivot axis, and wherein the bracket includes a first distal end disposed adjacent to the first end of the first component and a second distal end disposed adjacent to the second end of the first component, with the link rotatably attached to the first distal end of the bracket.

15. A resettable headlamp assembly, the assembly comprising:
a first component;
a headlamp assembly supported by the first component and movable between an initial position and a displaced position relative to the first component, with the headlamp assembly including a housing movable between the initial and displaced positions; and
an energy absorbing device operatively coupled to the headlamp assembly and the first component to allow movement of the headlamp assembly from the initial position to the displaced position to absorb energy when a first force is applied to the headlamp assembly and allow movement of the headlamp assembly from the displaced position back to the initial position when the first force is removed to reset the headlamp assembly back to the initial position; wherein the energy absorbing device includes a link movably coupled to the first component and spaced from the housing such that the housing moves between the initial and displaced positions in a spaced relationship from the movement of the link relative to the first component.

16. An assembly as set forth in claim 15 wherein the energy absorbing device includes a biasing mechanism coupled to the link such that the biasing mechanism continuously applies a second force to the link to bias the link to a first position when the headlamp assembly is in the initial position and bias the link to a second position when the headlamp assembly is in the displaced position, and wherein the biasing mechanism applies the second force as the link moves from the second position back to the first position to reset the headlamp assembly in the initial position.

17. An assembly as set forth in claim 16 wherein the biasing mechanism is further defined as a gas piston device attached to the first component and the link.

18. An assembly as set forth in claim 16 wherein the link includes a first end portion, a second end portion and a center portion disposed between the first and second end portions, with the center portion coupled to the first component by a pin such that the link moves relative to the first component during movement between the first and second positions, and wherein the biasing mechanism is attached to the second end portion of the link and attached to the first component to continuously apply the second force to the link.

19. An assembly as set forth in claim 18 wherein the first component includes a first end and a second end spaced from each other, and wherein the headlamp assembly includes a bracket attached to the housing such that the bracket supports the housing, with the bracket including a first distal end disposed adjacent to the first end of the first component and a second distal end disposed adjacent to the second end of the first component, and wherein the energy absorbing device includes a junction member movably attached to the first distal end of the bracket and the first end portion of the link to operatively couple together the energy absorbing device and the headlamp assembly.

20. An assembly as set forth in claim 18 wherein the first component defines a slot having a first portion and a second portion angled relative to each other, with the pin movably disposed in the slot such that the pin is disposed in the first portion of the slot when the link is in the first position corresponding to the headlamp assembly being in the initial position and the pin is disposed in the second portion of the slot when the link is in the second position corresponding to the headlamp assembly being in the displaced position.

* * * * *